United States Patent
Abrahami et al.

(10) Patent No.: US 12,026,216 B2
(45) Date of Patent: Jul. 2, 2024

(54) SYSTEM AND METHOD FOR DEEP LINKING AND SEARCH ENGINE SUPPORT FOR WEB SITES INTEGRATING THIRD PARTY APPLICATION AND COMPONENTS

(71) Applicant: Wix.com Ltd., Tel Aviv (IL)

(72) Inventors: Yoav Abrahami, Tel Aviv (IL); Uri Tagger, Even Yehuda (IL)

(73) Assignee: Wix.com Ltd., Tel Aviv (IL)

( * ) Notice: Subject to any disclaimer, the term of this patent is extended or adjusted under 35 U.S.C. 154(b) by 272 days.

(21) Appl. No.: 17/463,569

(22) Filed: Sep. 1, 2021

(65) Prior Publication Data

US 2021/0397777 A1    Dec. 23, 2021

Related U.S. Application Data

(63) Continuation of application No. 16/740,503, filed on Jan. 13, 2020, now Pat. No. 11,113,456, which is a continuation of application No. 15/233,987, filed on Aug. 11, 2016, now Pat. No. 10,534,818, which is a continuation of application No. 14/053,614, filed on Oct. 15, 2013, now Pat. No. 9,436,765.

(60) Provisional application No. 61/713,687, filed on Oct. 15, 2012.

(51) Int. Cl.
| | |
|---|---|
| *G06F 16/00* | (2019.01) |
| *G06F 16/951* | (2019.01) |
| *G06F 16/955* | (2019.01) |
| *G06F 16/958* | (2019.01) |
| *G06F 40/143* | (2020.01) |

(52) U.S. Cl.
CPC ........ *G06F 16/9566* (2019.01); *G06F 16/951* (2019.01); *G06F 16/955* (2019.01); *G06F 16/972* (2019.01); *G06F 40/143* (2020.01)

(58) Field of Classification Search
CPC .... G06F 40/143; G06F 16/955; G06F 16/972; G06F 16/951
See application file for complete search history.

(56) References Cited

U.S. PATENT DOCUMENTS

| | | | |
|---|---|---|---|
| 6,968,366 B1 * | 11/2005 | Zhang | ...... G06F 16/48 709/219 |
| 7,747,604 B2 | 1/2010 | Hawkins | |
| 7,672,938 B2 | 3/2010 | Hawkins | |
| 7,769,742 B1 | 8/2010 | Brawer et al. | |

(Continued)

OTHER PUBLICATIONS

R. Fielding et al.: RFC 2616—Hypertext Transfer Protocol—HTTP/1.1, W3C/MIT, Jun. 1999.

(Continued)

*Primary Examiner* — Leslie Wong
(74) *Attorney, Agent, or Firm* — HEIDI BRUN ASSOCIATES LTD.

(57) ABSTRACT

A method and system for a website building system (WBS) integrating at least one third party application includes detecting the presence of a spider associated with a search engine; parsing the output of said least one third party application to determine non-text components according to a request from said search engine spider, said non-text components having encoded or interleaved text, extracting said encoded or interleaved text from said non-text components; creating a search engine friendly page containing said extracted text; and providing said search engine friendly page to said spider.

14 Claims, 13 Drawing Sheets

(56) References Cited

U.S. PATENT DOCUMENTS

| | | | |
|---|---|---|---|
| 7,779,352 B1 | 8/2010 | Underwood et al. | |
| 7,840,648 B1* | 11/2010 | Rosenstein | G06F 16/958 |
| | | | 715/705 |
| 8,037,055 B2 | 10/2011 | Brawer et al. | |
| 8,095,911 B2 | 1/2012 | Ronen | |
| 8,572,559 B2 | 10/2013 | Calvin | |
| 8,620,773 B1 | 12/2013 | O'Neil | |
| 8,738,466 B1 | 5/2014 | Kirby | |
| 8,819,538 B2 | 8/2014 | Underwood | |
| 8,959,427 B1 | 2/2015 | Carlsson | |
| 9,213,687 B2 | 12/2015 | Au | |
| 9,262,420 B1* | 2/2016 | Schoeffler | G06F 16/14 |
| 9,436,765 B2 | 9/2016 | Abrahami | |
| 10,534,818 B2 | 1/2020 | Abrahami | |
| 11,113,456 B2 | 9/2021 | Abrahami | |
| 2001/0037258 A1 | 11/2001 | Barritz | |
| 2002/0022994 A1 | 2/2002 | Miller et al. | |
| 2002/0091736 A1 | 7/2002 | Wall | |
| 2003/0115572 A1 | 6/2003 | Zondervan et al. | |
| 2003/0217076 A1 | 11/2003 | Heptinstall et al. | |
| 2003/0225853 A1 | 12/2003 | Wang et al. | |
| 2005/0080908 A1* | 4/2005 | Allen | G06F 16/9566 |
| | | | 707/E17.115 |
| 2006/0070022 A1 | 3/2006 | Ng et al. | |
| 2007/0016577 A1 | 1/2007 | Lasa | |
| 2007/0050338 A1 | 3/2007 | Strohm et al. | |
| 2007/0106659 A1 | 5/2007 | Lu | |
| 2007/0143283 A1* | 6/2007 | Spencer | G06F 16/958 |
| | | | 707/999.005 |
| 2007/0233565 A1 | 10/2007 | Herzog | |
| 2007/0244883 A1 | 10/2007 | Bessieres | |
| 2008/0066080 A1 | 3/2008 | Campbell | |
| 2008/0189169 A1 | 8/2008 | Turpin | |
| 2008/0244505 A1 | 10/2008 | Smilowitz | |
| 2008/0250009 A1* | 10/2008 | Xie | G06F 16/951 |
| | | | 707/999.005 |
| 2009/0037355 A1* | 2/2009 | Brave | G06F 16/9535 |
| | | | 706/45 |
| 2009/0049403 A1 | 2/2009 | Jones | |
| 2009/0094137 A1 | 4/2009 | Toppenberg et al. | |
| 2009/0245122 A1 | 10/2009 | Maiocco et al. | |
| 2009/0292677 A1 | 11/2009 | Kim | |
| 2010/0049842 A1 | 2/2010 | Koski | |
| 2010/0114864 A1 | 5/2010 | Agam | |
| 2011/0023017 A1 | 1/2011 | Calvin | |
| 2011/0041090 A1 | 2/2011 | Ismalon | |
| 2011/0072366 A1 | 3/2011 | Spencer | |
| 2011/0087648 A1 | 4/2011 | Wang | |
| 2011/0131567 A1 | 6/2011 | Tirk | |
| 2011/0178831 A1 | 7/2011 | Ravichandran | |
| 2011/0264736 A1 | 10/2011 | Zuckerberg | |
| 2011/0320238 A1 | 12/2011 | Niheu | |
| 2012/0030592 A1 | 2/2012 | Cui | |
| 2012/0030732 A1 | 2/2012 | Shaty | |
| 2012/0089499 A1 | 4/2012 | Balthaser | |
| 2012/0089598 A1 | 4/2012 | Oztekin et al. | |
| 2012/0191691 A1* | 7/2012 | Hansen | G06F 16/951 |
| | | | 707/E17.108 |
| 2012/0284252 A1 | 11/2012 | Drai | |
| 2013/0007836 A1 | 1/2013 | Stevenson et al. | |
| 2013/0031466 A1 | 1/2013 | Curran et al. | |
| 2013/0198610 A1 | 8/2013 | Mokhtarzada | |
| 2013/0204746 A1 | 8/2013 | Lee | |
| 2013/0219263 A1 | 8/2013 | Abrahami | |
| 2013/0227078 A1 | 8/2013 | Wei et al. | |
| 2013/0290289 A1 | 10/2013 | Yu | |
| 2014/0006930 A1 | 1/2014 | Hollis | |
| 2014/0026048 A1 | 1/2014 | Spirer | |
| 2014/0047351 A1 | 2/2014 | Cui | |
| 2014/0047413 A1* | 2/2014 | Sheive | H04L 65/403 |
| | | | 717/110 |
| 2014/0096025 A1 | 4/2014 | Mandel | |
| 2014/0108373 A1 | 4/2014 | Abrahami et al. | |
| 2014/0130144 A1 | 5/2014 | Yang | |
| 2014/0181125 A1 | 6/2014 | Moitra et al. | |
| 2014/0201180 A1* | 7/2014 | Fatourechi | G06F 16/951 |
| | | | 707/706 |
| 2014/0207586 A1 | 7/2014 | Wo | |
| 2014/0207750 A1 | 7/2014 | De Datta | |
| 2015/0143226 A1 | 5/2015 | Greaves et al. | |
| 2015/0248484 A1 | 9/2015 | Yu | |
| 2016/0196448 A1 | 7/2016 | He | |
| 2017/0004159 A1 | 1/2017 | Voleti | |
| 2017/0185596 A1* | 6/2017 | Spirer | G06F 40/134 |
| 2017/0228711 A1 | 8/2017 | Chawla | |
| 2017/0351776 A1 | 12/2017 | Hancock | |
| 2018/0081976 A1 | 3/2018 | Dejuan | |

OTHER PUBLICATIONS

Schonfeld, Uri; Shivakumar, Narayanan. Sitemaps: above and beyond the crawl of duty. In: Proceedings of the 18th International Conference on World Wide Web. ACM 2009. pp. 991-1000. doi: 10.1145/1526709.1526842.

Cui, Meng; Hu, Songyun. Search Engine Optimization Research for Website Promotion. In: Information Technology, Computer Engineering and Management Sciences (ICM), 2011 International Conference on. IEEE, 2011. pp. 100-103. doi: 10.1109/ICM.2011.308.

* cited by examiner

SYSTEM AND METHOD FOR DEEP LINKING AND SEARCH ENGINE SUPPORT FOR WEB SITES INTEGRATING THIRD PARTY APPLICATION AND COMPONENTS

CROSS-REFERENCE TO RELATED APPLICATIONS

This application is a continuation of U.S. patent application Ser. No. 16/740,503 filed 13 Jan. 2020 which is a continuation of U.S. patent application Ser. No. 15/233,987, filed 11 Aug. 2016 which is a continuation of U.S. patent application Ser. No. 14/053,614, filed 15 Oct. 2013, which claims priority from U.S. Provisional Patent Application No. 61/713,687 filed Oct. 15, 2012, all of which hereby incorporated in its entirety by reference.

FIELD OF THE INVENTION

The present invention relates to website building systems and to linking to search engines in particular.

BACKGROUND OF THE INVENTION

There are many commercially available website building systems and other interactive application building tools that can be used to create and edit websites and other on-line applications. End users can access such websites using client software on a variety of different platforms such as regular personal computers, smart-phones, tablets and other desktop or mobile devices.

These website building systems can come in different configurations such as fully on-line website building systems which are hosted on a server or servers connected to the internet and which are accessed using internet communication protocols such as hypertext transfer protocol (HTTP). The creation, editing and deployment of these website building systems are all performed on-line working directly with the servers.

Website building systems can also be partially online where the website editing is performed locally on the user's machine and is later uploaded to a central server or servers for deployment. Once uploaded, these website building systems behave in the same way as fully on-line website building systems. Website building systems can also be off-line where both the editing and running of the application occur locally. The website may be distributed to other end-user machines through the Internet or some other off-line means.

Such website building systems may be accessed by different categories of users, including in particular designers (who create the websites) and end-users (which access the created websites, but may possibly modify them through mechanisms such as blog comments). Unless reference is made to one group in particular, reference to a user refer to both groups of users.

Website building systems have internal data architecture in order to organize data and elements within the system. This architecture may be different from the external view of the site in question as seen by the user and may also differ from the way typical hypertext markup language (HTML) pages are sent to the browser. For example, the internal data architecture can contain additional properties for each element on the page (creator, creation time, access permissions, links to templates etc.) which are essential for editing and maintaining the site within the website building system, but are not externally visible to the end-user (or even to some editing users). A typical architecture for a website building system based site may consist of pages containing components (e.g. shape components, picture components, text components, single- and multi-page containers containing mini-pages, etc.) as is illustrated in FIG. 1 to which reference is now made. As is shown, multi-page container a displays only one mini-page ($p_1$) at a time even though it is also associated with multiple pages $p_n$. Multi-page container b may also be associated with multiple mini-pages $q_n$ and may display some or all of them simultaneously.

Components may be content-less such as a star-shape which does not have any internal content (though it has color, size, position and some other parameters) or may have internal content, such as a text paragraph component, whose internal content includes the displayed text, as well as font, formatting and layout information. This content may, of course, vary from one instance of the text paragraph component to another.

Website building systems can also be extended using third party applications and components embedded in them. Such third party applications may be included in the website building system design environment or may be purchased (or otherwise acquired) separately through a number of distribution mechanisms, such as from an application store (AppStore) integrated into the website building system, from a separate, web-based or standalone application repository (or AppStore) operated by the website building systems (WBS) vendor or by another entity. Third party applications may also be obtained directly from the third party application vendor (through an AppStore or not)—which would provide an actual installation module, or just an activation or access code.

Third party applications may come in different formats such as widget-type third party applications which are embedded inside a web site page as a component, and page set-type third party applications which are added to the web site as an additional page or pages. Third party applications (both widget-type and page-set-type) can be either single page or multi-page applications (which have internal mini-pages represented as an internal uniform resource locator (URL) structure). Widget-type third party applications typically provide a home page, which can be considered a default "landing" mini-page.

The use of third party applications in website building system based websites is done through third party application instances. The website building system can usually support multiple uses of third party applications at different levels such as allowing a single third party application instance in the whole website or by allowing instances of multiple third party applications to be created within the website, but only allowing one instance per site or given page. The website building system can also allow multiple instances of multiple third applications parties to be created without any limitations on the amount, multiplicity or location of the third party application instances.

The website building system may support third party applications deployed on its own vendor server, on the third party application server, on an external $4^{th}$ party server or on any combination thereof. A third party application may also include elements actually running on the end user machine such as a statistically-installed browser extension or dynamically run JavaScript component running inside the website building system client-side code as is illustrated in FIG. 2 to which reference is now made. A third party application may further include elements running on the website building system server. The website building system vendor's servers act as a contact point for the end users and can respond to requests, possibly connecting to the third party application's vendor's server to receive required information. The website building system may create direct connections (as required) between the client computer and the third party application vendor's servers such as when video streaming is required.

Included third party application instances can have their own internal content, similar to the way in which regular components include internal content (such as a text paragraph component). The third party application may manage this content independently of the website building system and of the website generated using the website building system as is illustrated in FIG. 3 to which reference is now made. As can be seen, main page a contains third party application instances b and c from different third party applications. The output from included third party applications may be integrated into the created web site in a number of ways—through server side processing, client-side processing, iframes or otherwise.

Created websites (and pages) may be accessed using their URL which typically provides a direct link (or deep link) to specific pages within the website. The URL of a particular website may typically be in the format of:

<http://www.WbsVendor.com/WbsUser/WbsSite> or
<http://www.WbsVendor.com/WbsUser/WbsSite/PageName>

The web site builder server may provide a shorter URL which is mapped to the URL above such as:

<http://www.MyWbsSite.com/PageName> or
<http://www.MyWbsSite.com#!PageName>

The website building system may also provide hierarchy support e.g. having page groups which include created pages. In this case the assigned URL may be (for example):

<http://www.MyWbsSite.com/GroupName/SubgroupName/PageName>.

Search engines (such as Google Inc.'s Google or Microsoft's Bing) are the most common way to access websites today. Many users do not even bother remembering the regular site URL or name, but rather perform a web search to get to the required site whenever needed. Search engines typically index multiple pages within the site—not just the top-level site entry pages, but internal site pages as well. These links to internal pages are known as deep links. Many website building systems incorporate search engine optimization in order to ensure that the website being built can be accessed by search engine web crawlers or spiders. Website building systems provide for each page an alternate version of the displayed page for use by spiders. This version includes the extracted text from the components of a page and is formatted and optimized for reading. This version may be known as the search engine friendly version of the page. The website building system can also implement search engine optimization techniques in the creation of these page variants so as to improve the ranking of the specific pages by crawling search engines. Aside from displaying the search engine friendly version of the page, the system can also generate relevant sitemaps to guide the spiders as to which URLs to request so that all site pages are indexed.

SUMMARY OF THE PRESENT INVENTION

There is provided in accordance with a preferred embodiment of the present invention, a method for a website building system (WBS) integrating at least one third party application, the method includes detecting the presence of a spider associated with a search engine; parsing the output of the least one third party application to determine non-text components according to a request from the search engine spider, the non-text components having encoded or interleaved text; extracting the encoded or interleaved text from the non-text components; creating a search engine friendly page containing the extracted text; and providing the search engine friendly page to the spider.

Moreover, in accordance with a preferred embodiment of the present invention, the third party application is at least one of: a single page and a multipage application.

Further, in accordance with a preferred embodiment of the present invention, the non-text components contain video.

Still further, in accordance with a preferred embodiment of the present invention, the detecting is via at least one of: the spider originating IP, the request structure of the spider, the request header of the spider and the use of AJAX crawling URLs (uniform resource locators).

Additionally, in accordance with a preferred embodiment of the present invention, the creating a search engine friendly page includes substituting HTML iframe tags with tags visible to the spider.

Moreover, in accordance with a preferred embodiment of the present invention, the request is at least one of: a manually entered URL of a specific page, the homepage of a requested site or a request to a general page redirected by the search engine.

There is provided in accordance with a preferred embodiment of the present invention system for a website building system (WBS) integrating at least one third party application. The system includes an access type detector to detect the presence of a spider associated with a search engine; a TPA (third party application) content coordinator to parse the output of the least one third party application to determine non-text components according to a request from the search engine spider, the non-text components having encoded or interleaved text and to extract the text; a page content composer to create a search engine friendly page containing the extracted text; a renderer to render the search engine friendly page; and a displayer to display the search engine friendly page to the spider according to the renderer.

Moreover, in accordance with a preferred embodiment of the present invention, the third party application is at least one of: a single page and a multipage application.

Further, in accordance with a preferred embodiment of the present invention, the non-text components contain video.

Still further, in accordance with a preferred embodiment of the present invention, the access type detector detects via at least one of: the spider originating IP, the request structure of the spider, the request header of the spider and the use of AJAX crawling URLs (uniform resource locators).

Additionally, in accordance with a preferred embodiment of the present invention, the renderer substitutes HTML iframe tags with tags visible to the spider.

Moreover, in accordance with a preferred embodiment of the present invention, the request is at least one of: a manually entered URL of a specific page, the homepage of a requested site or a request to a general page redirected by the search engine.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
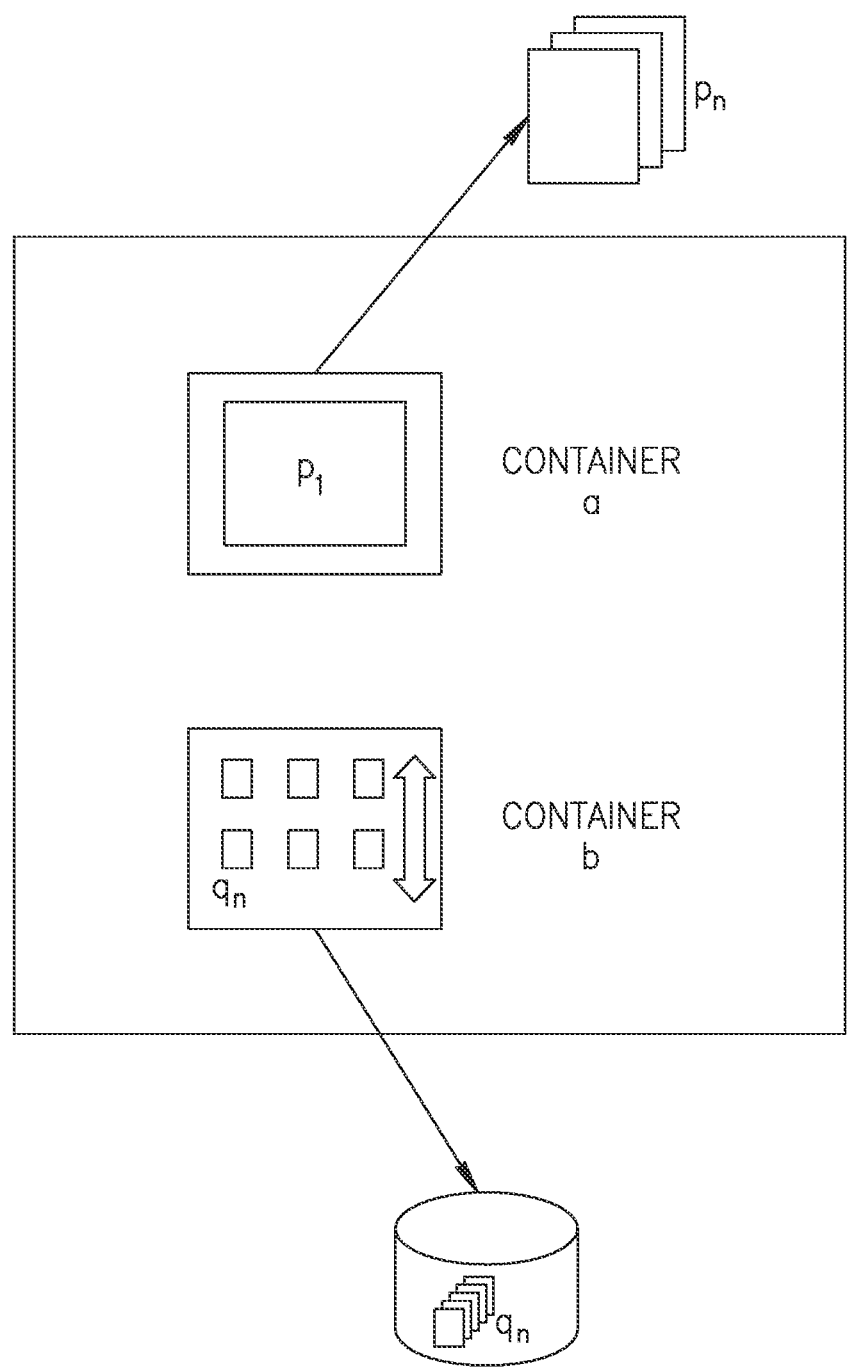
FIG. 1 is a schematic illustration of a typical website page comprising containers, components and mini-pages.
Figure 2:
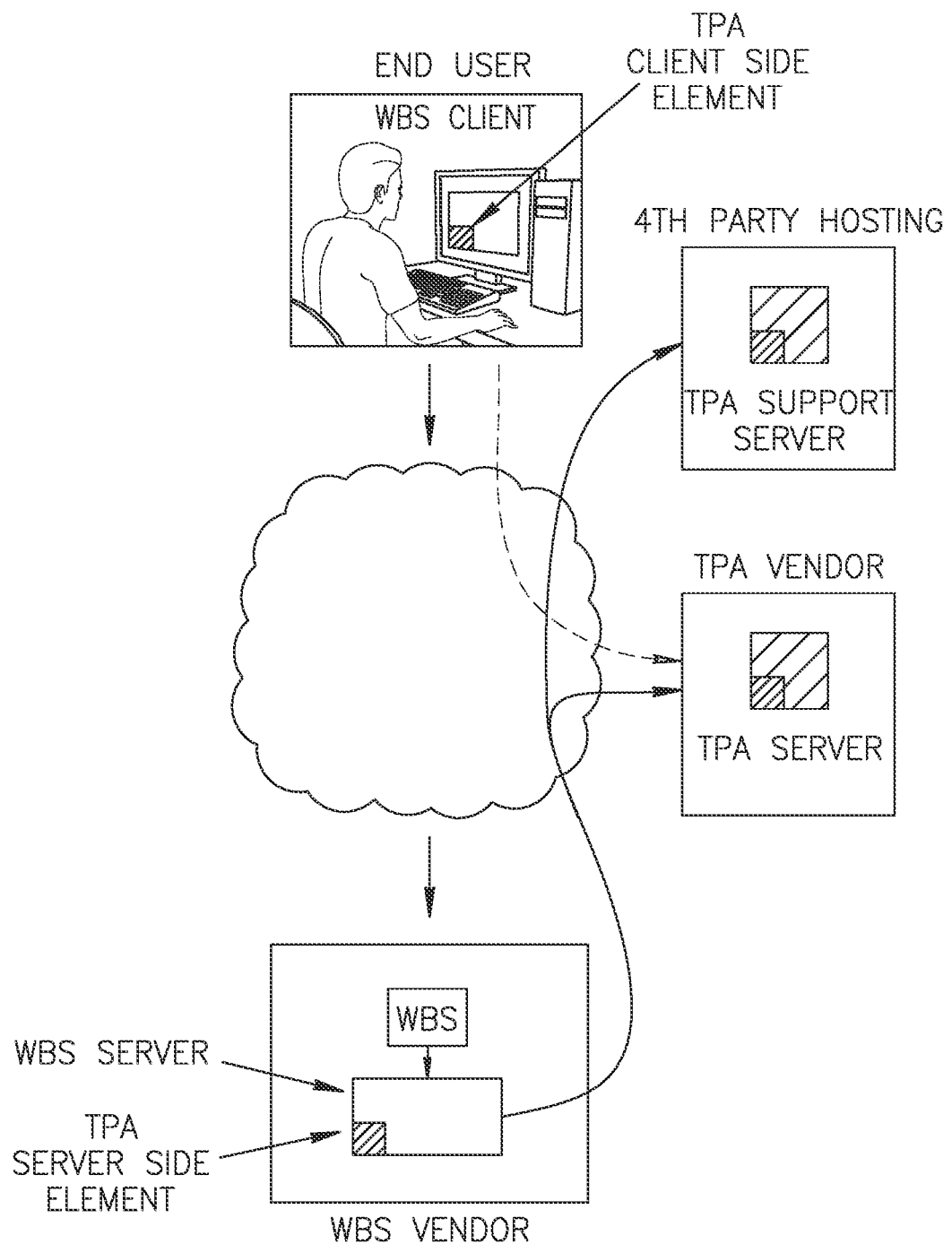
FIG. 2 is a schematic illustration of a typical configuration website building system integrated with a third party application.
Figure 3:
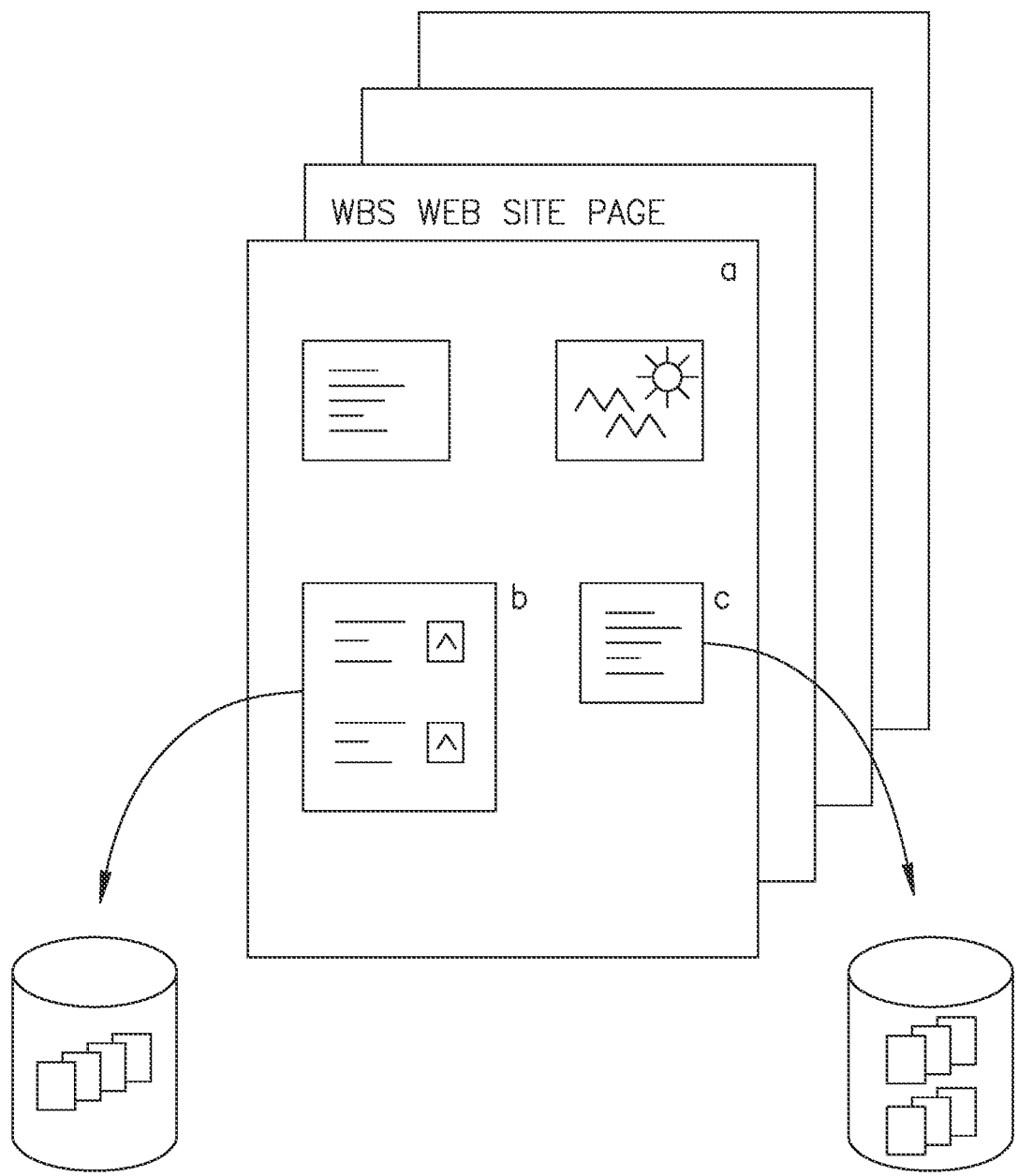
FIG. 3 is a schematic illustration of third party application internal content management.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that users of a website building system that incorporates single and multiple instances of third party applications would like their sites to be searchable through regular web search engines (such as Google and Bing) which use spiders to index a website (as discussed herein above). Applicants have also realized that dynamic web sites (such as the sites created using a website building system) do not have regular, static HTML pages. Instead, the pages are dynamically generated by the website building system server component or some other technology such as ASP or PHP and may contain content not easily read by spiders.

Existing web site building systems usually provide deep links to specific main pages on the site. However, such main pages may have multiple configurations due to third party applications within the particular page showing different mini-pages inside them (the system may support one such third party application per main page or possibly more). Existing systems also do not provide a way to deep link to a specific configuration, and do not provide a method for a given third party application page to use a provided outgoing deep link to a specific configuration of the same main page or of a different main page.

Furthermore, existing systems do not provide a way for spiders to separately scan (and thereby index) multiple configurations of composite pages which include the "wrapper" main page together with each mini-page of contained third party application or applications.

Applicants have also realized that content from a third party application is often combined with the content of the main page using the HTML iframe tag (or multiple such iframe tags) and that search engines typically do not follow iframe tags or search their content. iframe tags need to be dissolved in order to access their content. Thus third party application content may not be visible to these search engines.

It will be appreciated that the actual execution of the third party application often involves running all or some of its code on a separate third party application vendor server. This server may malfunction and fail, thus failing to deliver the content of the mini-pages from the third party application. If this happens when a human user is accessing the combined site, the user may complain or provide feedback. However, when this happens during a spider run, valuable content which may otherwise be accessible may be lost causing parts of the combined website to be un-indexed or improperly indexed.

As discussed herein above, websites may incorporate search engine optimization. The application of these techniques often requires professional expertise together with specific knowledge of the site content. The web site developer may be better qualified than the third party application provider to apply such optimization techniques and to know what the optimal techniques are. It will be appreciated that some search engine optimization techniques are considered as bad practice by the major search engine providers and their use in a web site may cause the search engine to penalize the website (or even remove it altogether from the search engine index). Thus if a third party application included in the site uses an improper technique for search engine optimization, the entire site may be penalized, without the site designer being aware of such penalization.

Figure 4:
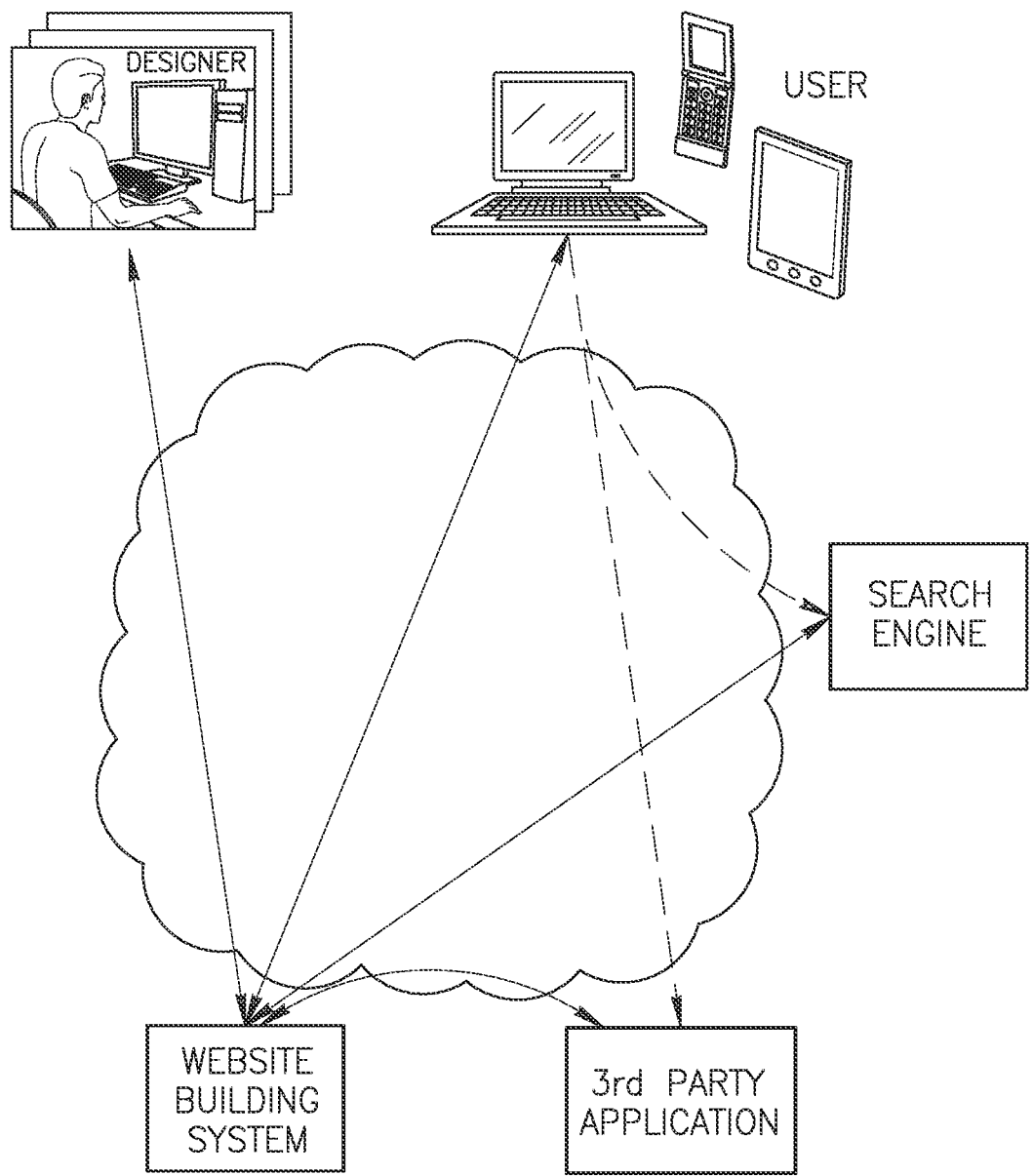
FIG. 4 is a schematic illustration of the different elements involved when integrating a website building system using a third party application with search engine optimization, constructed and operative in accordance with the present invention.

Reference is now made to FIG. 4 which illustrates the different elements that may be involved when using a website building system that integrates a third party application together with search engine optimization. It will be appreciated that all the elements may communicate with the website building system via any communication medium such as the internet. It will be further appreciated that a user may also communicate with the third party application and/or the search engine independently of the website building system.

Figure 5:
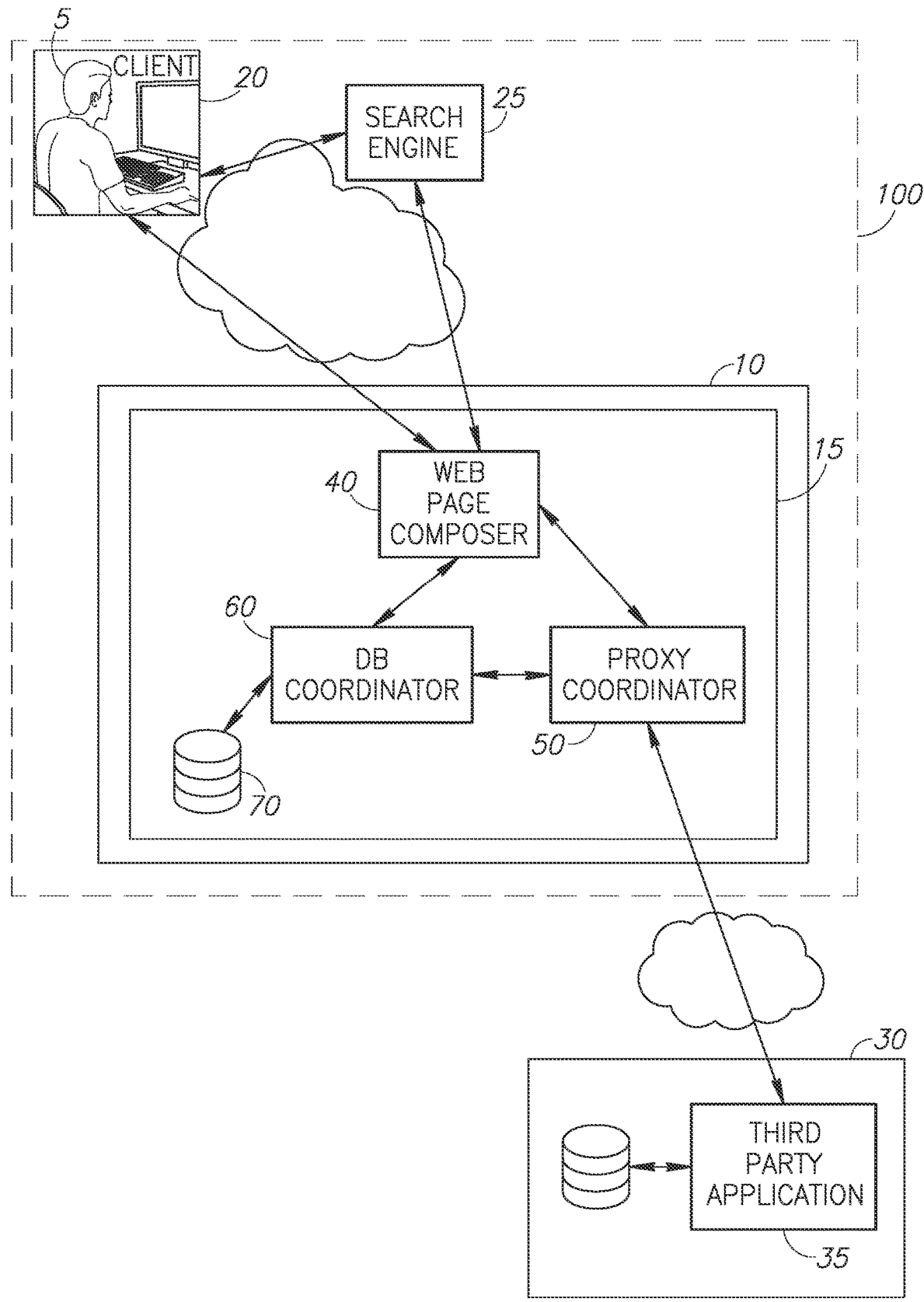
FIG. 5 is a schematic illustration of a system with the implementation of deep linking and search engine optimization support and control in website building systems which integrate third party applications, constructed and operative in accordance with the present invention.
Figure 6:
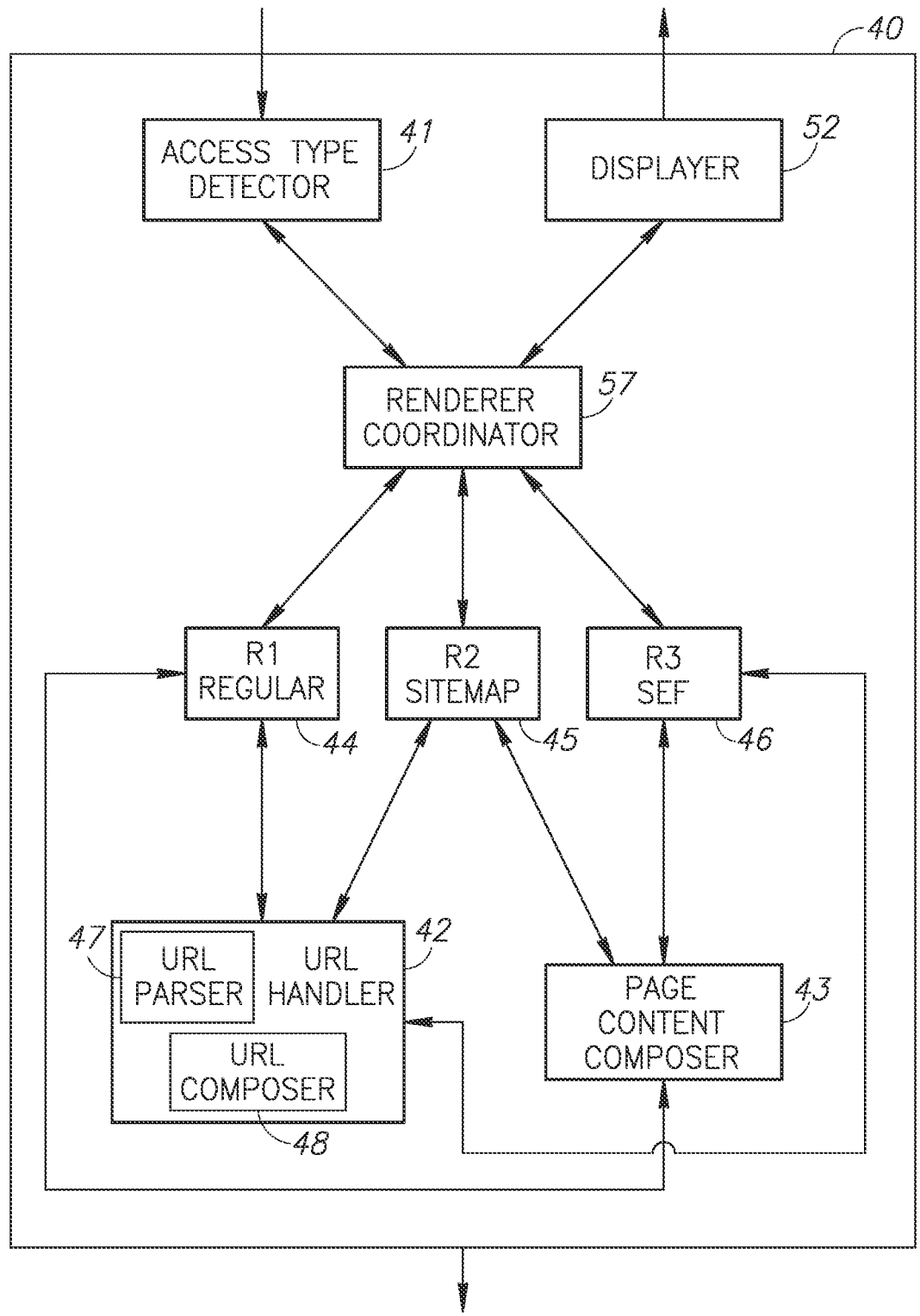
FIG. 6 is a schematic illustration of the web page composer of FIG. 5, constructed and operative in accordance with the present invention.
Figure 7:
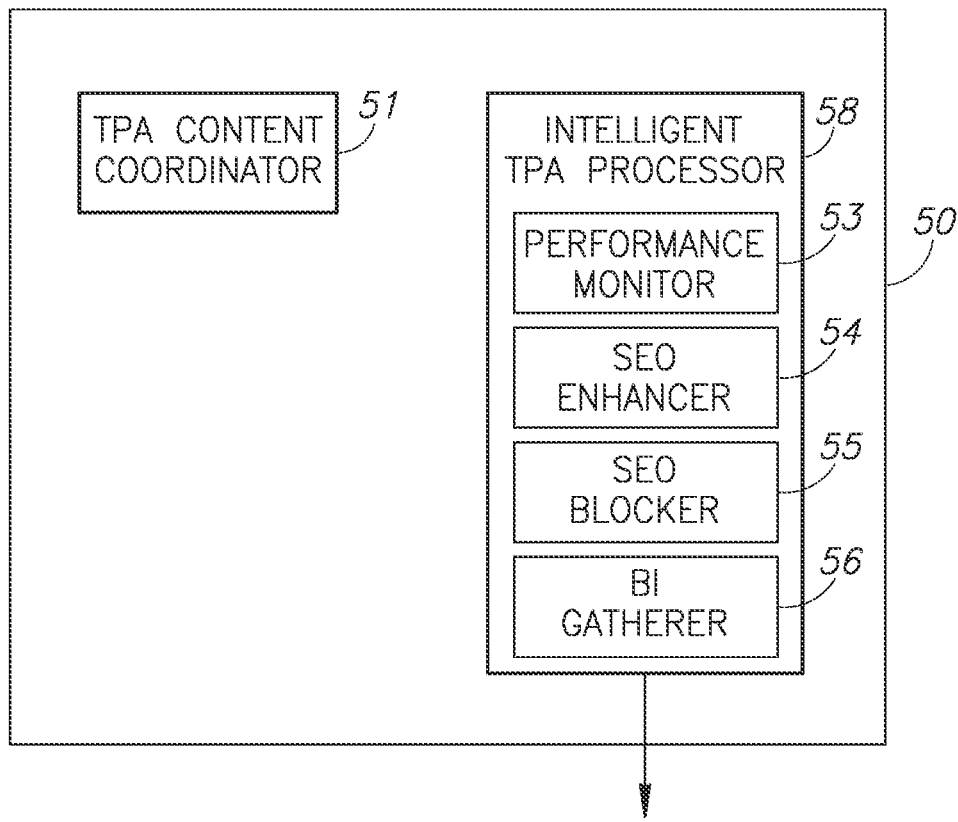
FIG. 7 is a schematic illustration of the proxy coordinator of FIG. 5, constructed and operative in accordance with the present invention.

Reference is now made to FIG. 5 which illustrates a system 100 for the implementation of deep linking and search engine optimization support and control in website building systems which integrate third party applications in accordance with a preferred embodiment of the present invention. System 100 comprises a website building system server 10 and a client 20. Website building system server 10 may be in communication with a third party application server 30. Website building system server 10 may host a website building system 15 which includes a database coordinator 60 and a database 70. Website building system 15 may further comprise a web page composer 40 and a proxy coordinator 50. Reference is now made to FIG. 6 which illustrates the elements of web page composer 40 which may further comprise an access type detector 41, a displayer 52, a renderer coordinator 57, a URL handler 42, a page content composer 43, a regular renderer 44, a sitemap renderer 45 and a search engine friendly renderer 46. URL handler 42 may further comprise a URL parser 47 and a URL composer 48. Reference is now made to FIG. 7 which illustrates the elements of proxy coordinator 50 which may further comprise a third party application (TPA) content coordinator 51 and an intelligent third party application processor 58. Intelligent third party application processor 58 comprises a performance monitor 53, a search engine optimization enhancer 54, a search engine blocker 55 and a business intelligence gatherer 56. The functionality of the elements of system 100 is described in more detail herein below. Third party application server 30 may host a third party application 35. A user 5 at client 20 may access pages from website building system 15 either directly using a specific URL or via URLs retrieved from a search engine 25. Database 70 may store website content and created pages and may also store created URLs and third party application 35 access logs as described in more detail herein below.

It will be appreciated that for the sake of illustration, system 100 is an interactive editing environment used by a designer which handles website creation as well as website maintenance. However, a website building system might be a programmer-oriented one, in which the website building system infrastructure is provided to the designer as a set of components (including third party applications as described below), and the designer/developer is responsible for the integration of the supplied infrastructure components so to create the website pages.

It will be also appreciated that for the sake of illustration, system 100 comprises an online website building system 15 which embeds a third party application 35 hosted on a different web server 30. It will be further appreciated that system 100 may be applied to partially online as well as off-line systems and to any combination of third party application hosting scheme such as client-side elements, website building system vendor servers, third party applications vendor servers, $4^{th}$ party servers etc. It will be appreciated that in an off-line embodiment, a server-based element (separate from website building system 15 and any of its created sites) may be required to implement third party application 35 support and search engine optimization capabilities as described in more detail herein below.

It will be further appreciated that system 100 may support the full gamut of third party application 35 inclusion options, i.e. it may allow the inclusion of multiple instances of the same or multiple third party applications 35 in the same main page or containers as well as the inclusion of multiple page-set-type third party applications 35 which are handled as additional site pages instead of elements inside specific pages. It will be appreciated that system 100 may also only implement a subset of these options too or may place restrictions on third party application 35 inclusion possibilities.

System 100 may also be applied to on-line application editing systems which use the internet (or any other network connection) and use non browser client side software to view the created online application. In this scenario, system 100 may not need to use the specific technologies (e.g. IP communication, HTTP, HTML etc.) which underlie the regular web infrastructure.

It will be further appreciated that system 100 may also be hosted by a different server set such as in house servers for a large organization. System 100 may also be a separate software system or may be embedded inside a hardware system implemented in hardware or firmware. System 100 may also be embedded inside a standalone system as well as inside a system embedded within a larger host system through an API connection, a web services connection or other type of interface.

As discussed herein above, third party applications 35 may be included inside existing main site pages or may be added to the main site. System 100 may be configured to apply limitation to the inclusion of third party application 35 for example by allowing only one third party application 35 per page or by requiring third party application 35 to be included inside specific types of container components. Third party application 35 may also implement inclusion of user generated content at different levels such as an e-store third party application 35 which may be customized by user 5 to include his or her items for sale or a blog third party application 35 which may contain blog entries added by user 5. This additional data may be stored in database 70 or may be held independently on third party server 30 or on any external $4^{th}$ party server or combination thereof.

It will be appreciated that third party application 35 may also be parameterized such as to allow each instance of mapping third party application 35 to specify which map resolutions should be available to user 5. Third party application 35 may also typically provide a main display frame which is integrated into the pertinent website page using an HTML iframe tag or similar mechanism. Third party application 35 may also provide additional versions (via additional iframes) which are included in the website as alternative widgets. For example, a blog third party application 35 may provide an additional widget (showing the latest blog entries) which may be added to the main site's home page. Third party application 35 may also provide additional HTML iframes which are not part of the regular displayed page. It will also be appreciated that third party application 35 may use the API connecting it to website building system 15 to provide additional iframes for extra dialogs, possibly providing to the website building system 15 additional display parameters for these dialogs.

Figure 8:
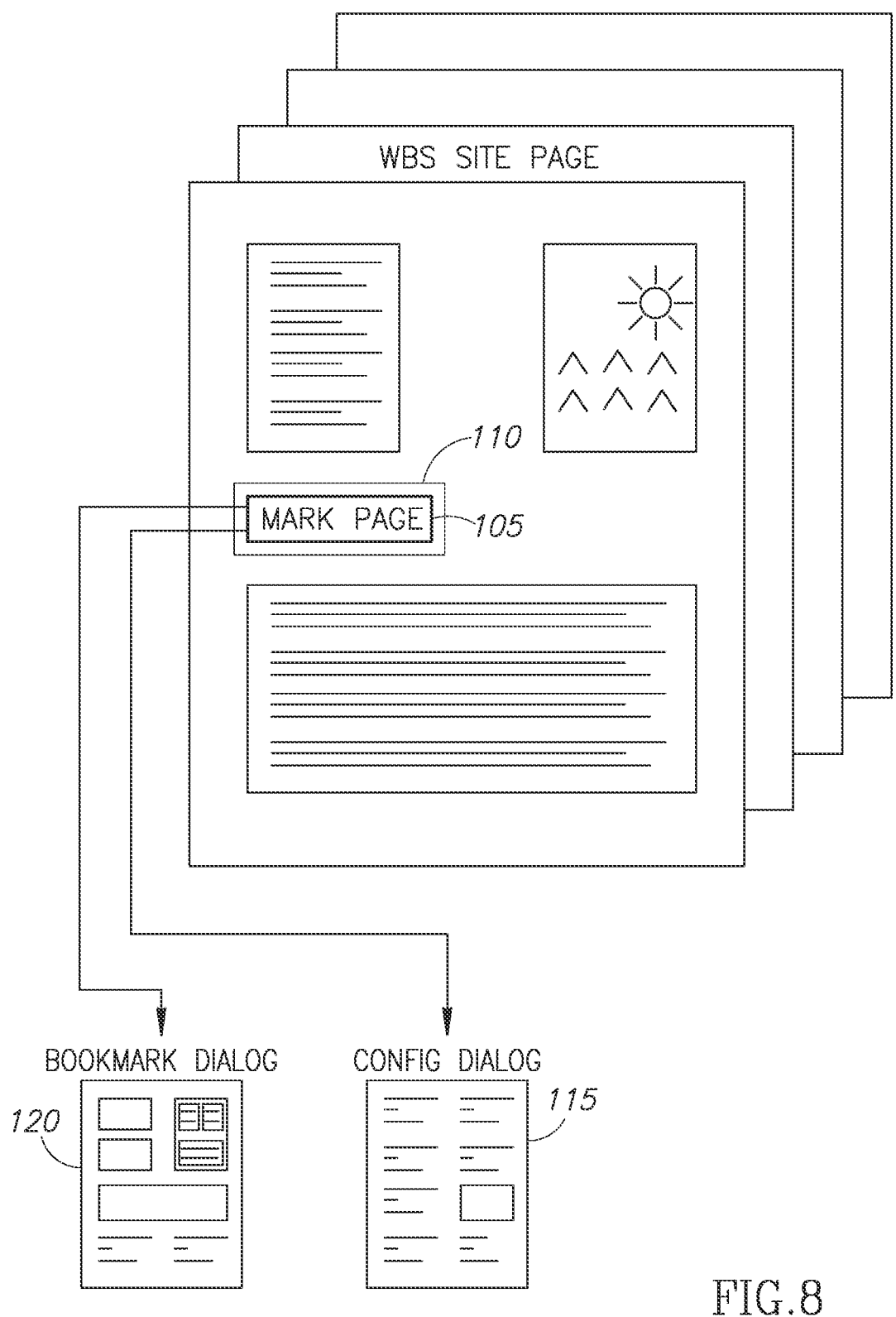
FIG. 8 is a schematic illustration of an example of third party application functionality.

Reference is now made to FIG. 8 which illustrates how a bookmark service may provide a widget 110 which only provides a small button 105. Pressing button 105 may open the full bookmark dialog 120 via an additional iframe provided by third party application 35. It will be appreciated that when working in the design environment of website building system 15, pressing button 105 in a different way such as by using a keyboard combination instead of a mouse click, may open a different dialog (configuration dialog 115) through a different iframe which is also provided by third party application 35.

As discussed herein above, users of website building system 15 would like their sites to be searchable through regular web search engines which use spiders/crawlers to index the site. It will be appreciated, that the purpose of system 100 is to employ URL assignment and parsing techniques within the interface between the website building system and the embedded third party applications 35 in order to ensure that content from third party application(s) 35 is also available to search engines for indexing, and is properly integrated with the main pages containing the pertinent third party application(s) 35.

An example of such third party application 35 content may be a component containing video which may have text captions which are stored encoded and interleaved within the video frames inside the video file. Typically, text from third party application 35, text from third party application 35 mini-pages, multi-page container mini-pages or other sources contained inside iframes may be ignored by spiders.

Access type detector 41 may detect the presence and type of search engine spider in action or may receive a URL request from user 5. The URL request from user 5 may be in the form of a manually entered URL of a specific page, the homepage of a requested site or may be a request to a general page redirected by search engine 25. Detector 41 may detect the presence of the spider via the spider originating IP, via the request structure of the spider, via the request header of the spider or via the use of AJAX crawling URLs. Detector 41 may then forward this information to renderer coordinator 57 who may instruct the relevant renderer (44, 45 and 46) to provide a regular page, a sitemap or an appropriate search engine friendly version of the pertinent page according to the request. It will be appreciated that regular renderer 44 may generate a regular page for display, sitemap renderer 45 may provide a sitemap to the spider and search engine friendly renderer 46 may create the search engine friendly version of the pertinent page whenever a page is requested by the spider. As discussed hereinabove, the search engine friendly version of the page may include the extracted text from the components on the page in an appropriate optimized format for the search engine 25 from where the spider has been sent. The search engine friendly page may also substitute HTML iframe tags with spider visible tags such as HTML section tags.

It will be appreciated that all three renderers (44, 45 and 46) may work together with both URL handler 42 and page content composer 43 in order to return to renderer coordinator 57 the correct page or sitemap. Renderer coordinator 57 may return the final page/sitemap to user 5/search engine 25 via displayer 52 as described in more detail herein below.

URL parser 47 may interpret the incoming URLs (from the URL used to access the page or from URLs contained inside handled pages), may extract an identifier for any third party application 35 instances that may be required and may instruct URL composer 48 to reconstruct the URL accordingly for use taking into account the extracted identifiers for third party application 35 instances—either for direct use or for use inside created pages (e.g. replacing existing URLs which are not integrated with the pertinent website building system 15). It will be appreciated that page content composer 43 may either instruct database coordinator 60 provide content either stored on database 70 or proxy coordinator 50 to provide content from third party server 30 (via TPA content coordinator 51) accordingly.

As discussed hereinabove, URLs typically provide deep or direct links to specific pages in a website. It will be appreciated that embedded third party applications 35 which contain multiple mini-pages of their own may be included inside a main page containing the entire third party application 35 instance and its mini-pages from herein known as multi-page third party application. It will also be appreciated that a regular web page (not involving a third party application 35) may have multi-page containers also containing multiple mini-pages. These included mini-page collections may be thought of as a mini web-site within a site.

URL composer 48 may provide an access mechanism using a permanent link known as a permalink URL such as:
<Http://www.MyWbsSite.com/PageName/TPAorMPCname/ThirdpartyURL> or
<Http://www.MyWbsSite.com/PageName/PageID/TPAorMPCname/ThirdpartyURL>

Where TPA is third party application 35, MPC are multi-page containers and the "ThirdpartyURL" is a third party application 35 internal URL (which may have multiple separated elements and/or multiple URL parameters) and which is managed by third party application 35 (in the case of a third party application 35 container) or by a website building system 15 managed multi-page container internal page (in the case of multi-page containers).

It will also be appreciated that URL composer 48 may use a shorter form of URL for website building system 15 that only allows a single page third party application 35 per main page which may omit the "TPAorMPCname" i.e.:
<Http://www.MyWbsSite.com/PageName/PageID/ThirdpartyURL>.

Proxy coordinator 50 may act as an interface between website building system 15 and third party application server 30 allowing user 5 at client 20 to interact with third party application 35 (unless a direct connection is available such as the one illustrated in FIG. 4).

URL composer 48 may then forward the URL to third party application 35 via proxy coordinator 50. Third party application 35 may then provide a URL to the pertinent content of the section required such as:
<Http://www.ThirdPartySite.com/ThirdPartyURL?appId=ID& . . . >
For example, ID may be an instance ID for third party application 35 inclusion instance which may be unique at third party application 35 vendor level. This may allow third party application 35 to use this ID to save instance-specific settings etc. The URL may also include additional parameters after the '&' character (e.g. login status, premium status etc.).

It will be appreciated that there may be scenarios when a single page may contain instances of multiple but different third party applications 35 or multi-page containers. For example, URL composer 48 may create, for a site containing a blog third party application 35, the following URL:
<http://www.MyWbsSite.com/PageNameBlog/posts/PostID/TalkBackID>,
in which PostID and TalkBackID are both managed by blog third party application 35.

Alternatively, website building system 15 may allow multiple instances, either by providing automatic IDs to differentiate between the multiple instances (for example TPA01, TPA02) or by allowing user 5 to assign specific instance names to multiple instances of the same third party application 35 in a single page. Such a user-assigned name can also help in creating a more mnemonic or clearer name and thus may be useful even if no single-page multiple instances exist. It will be appreciated that if this assigned name is unique at the website level, URL composer 48 may create a shorter form to be used such as:
<http://www.MyWbsSite.com/TMIname/ThirdPartyURL>
where TMI is the user assigned name. It will also be appreciated that these links act as permalinks to the specific mini-pages, i.e. they do not change as additional pages are added or modified. When accessed directly by user 5, the main web site will open at the specific main page (e.g. the website page of the blog), while requesting the embedded third party application 35 to open the specific mini-page (e.g. the specific blog entry).

Website building system 15 may also allow multi-page third party applications 35 inside a single page (either side by side or in a containment hierarchy) or a separate position indicator may be required for each of the embedded third applications 35. In these cases, URL composer 48 may create a permalink which provides multiple position indicators, using formats such as:

<http://www.MyWbsSite.com/PageName/TMI1:
TPURL1+TMI2:TPURL2> or

<http://www.MyWbsSite.com/PageName/TMI1:
TPURL1&TMI2:TPURL2> where TPURLx is the numbered third party application URL and TMIx is the numbered user assigned name as described herein above.

It will be appreciated that occasionally, third party application 35 mini-pages may need to include deep links going directly from them and not those created by URL composer 48. Such deep links may point to different mini-pages inside the same third party application 35 instance, to mini-pages in a difference instance of the same third party application 35 in the same main site or to mini-pages in a different third party application from the same third party application 35 vendor in the same main site. Deep links could also point to mini-pages in a different third party application from a different third party application 35 vendor in the same site, to main pages in the same site (which do not belong to third party application 35) or to main pages or third party application mini-pages in a different main site.

These deep links may be constructed by third party application 35 by building up on a basic URL provided by URL composer 48 or by using a JavaScript API which is implemented in the client code for website building system 15.

For example, for the first scenario, if a third party application 35 mini-page at ThirdPartyURL1 requires a deep link to a third party application 35 mini-page at ThirdPartyURL2, URL composer 48 may provide a sectional URL prefix parameter which may have the value:

<http:/www.MyWbsSite.com/PageName/TPAorMPC-name> as described herein above. Third party application 35 may take the value of the sectional URL parameter and concatenate it to its deep link to get the site URL pointing at the content of the ThirdPartyURL2 state of third party application 35. Third party application 35 may then format the HTML anchor "a" tag using the concatenated URL and by using a target attribute "_top" which instructs the browser to open the concatenated URL when the link is clicked and logically replaces the URL of the containing combined page with the concatenated URL. Thus, if the containing page is refreshed (for example), the correct deeplink may be re-loaded.

When navigation to a different deep-linked mini-page (or main page) is required, third party application 35 may call a JavaScript method provided by system 100. This JavaScript method may do the navigation required and may update the browser top window URL to display the new linked page. System 100 may provide a number of variants for this method as per the different types of outgoing links as described herein above. Some variants may require additional information identifying the additional third party application 35 mini-pages/main pages/sites to which the outgoing link points. System 100 may also identify the target site/page/third party application instance and may construct the relevant combined URL and links to it.

As discussed hereinabove, renderers (44, 45 and 46) may return regular pages, sitemaps or search engine friendly pages to displayer 52 for display. Regular renderer 44 may be activated whenever a regular page is served for display using the displayed URL and may integrate the main page (from the main site) with the mini-pages provided by third party application 35 for the contained third party application 35 widgets and mini-pages. It will be appreciated that whenever a URL is requested which contains a permalink to an internal third party application 35 page (or pages in the case of multiple third party applications in one page), regular renderer 44 may request the specific pages/widgets from the relevant third party application(s) 35 as described herein above and may integrate them into the appropriate main page.

Sitemap renderer 45 may be used whenever a sitemap is requested. Sitemap renderer 45 may call on each of the embedded third party applications 35 to provide its own sitemap for all instances of third party applications 35 contained in the main page. Sitemap renderer 45 may then integrate these sitemaps together with the sitemap of the main site in order to provide a fully integrated sitemap. As part of this integration process, the internal URLs from third party application 35 returned as part of the sitemap for third party applications 35 may be converted (by URL composer 40) to composite URLs which can be later used by search engine 25 or user 5 for external access to the third party applications 35 mini-pages contained in the main page.

It will be appreciated that when sitemap renderer 45 generates the sitemap by a given third party application 35, third party application 35 may enumerate the mini-pages contained in the specific instance based on the internal data not otherwise exposed. This may include, for example, creating a URL for each record in an internal database stored in a database residing on the third party application server 30—even if the containing website has no such database record enumeration function. Furthermore, different instances of the same third party application 35 (even these located in the same containing page) may return different instance-specific sitemaps, since the URLs included in the sitemap of third party applications 35, may depend, for example, on instance-specific parameters or on containing-page-specific values.

Sitemap renderer 45 may also use the third party application 35 provided timestamps in order to set the timestamp of the containing page (and to possibly prevent unnecessary indexing) and then may return the integrated file to the spider via displayer 52.

Search engine friendly renderer 46 may be used when a page is requested by a spider and may create a search engine friendly version of the main page. If only the main page is requested, renderer 46 may include the search engine friendly version of the home page of each third party application 35 embedded in the page as well as the additional mini-page combination as described herein below. If a URL is requested which refers to a specific third party application mini-page(s), renderer 46 may include the search engine friendly version of the requested third party application 35 mini-pages(s) within the main page.

Figure 9:
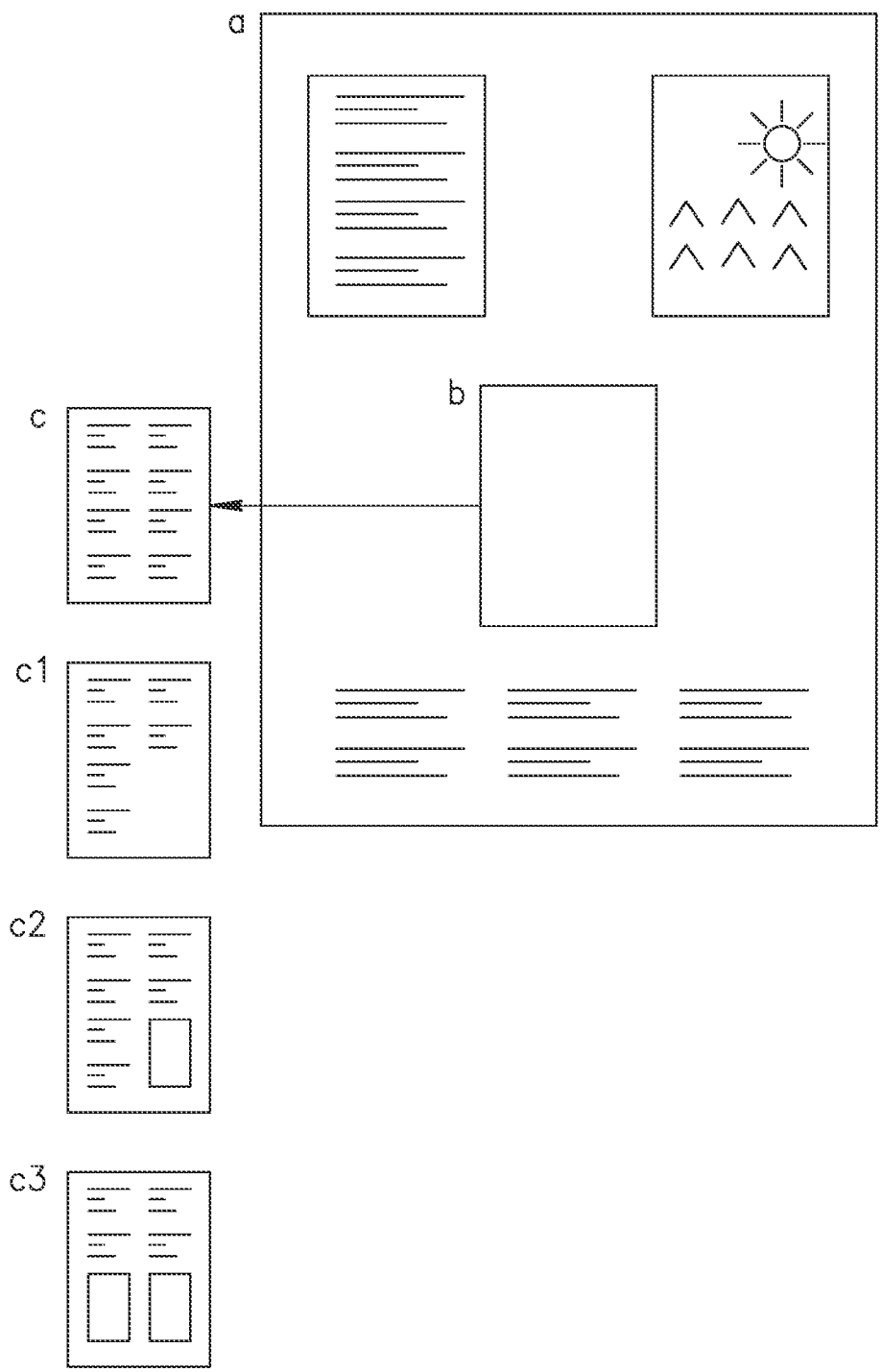
FIG. 9 is a schematic illustration of how a main page with a third party application having multiple mini-pages may be indexed.
Figure 10:
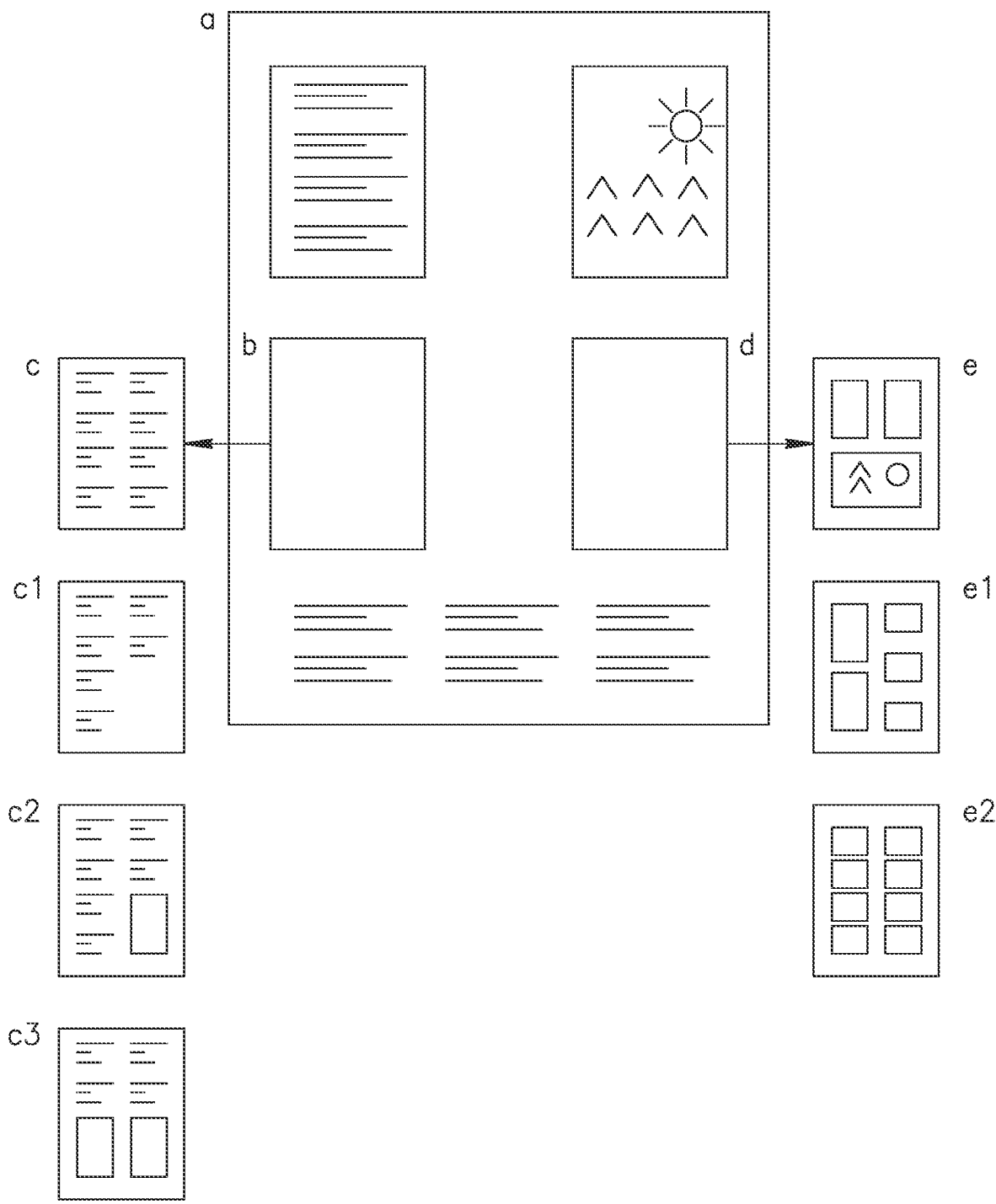
FIG. 10 is a schematic illustration of how a main page with two third party applications having multiple mini-pages may be indexed.

Reference is now made to FIG. 9 which illustrates how a main page with a third party application 35 having multiple mini-pages may be indexed. Main page [a] includes the third party application [b] home page [c] and the additional mini-pages [c1], [c2] and [c3]. It will be appreciated that in this scenario, the indexing spider may index the following combined pages (all of which are generated by search engine friendly renderer 46, usually based on composite URL's created in the combined sitemap as generated by the sitemap renderer 45):

[a]+[c];
[a]+[c1];
[a]+[c2];
[a]+[c3];

Reference is now made to FIG. 10 which illustrates a main page [a] with two third party applications 35 [b] and [d] having multiple mini-pages ([c1]/[c2]/[c3] for [b] and [e1]/[e2] for [d]). In this scenario, the indexing spider may index the following combined pages:

[a]+[c]+[e];
[a]+[c1]+[e];
[a]+[c2]+[e];
[a]+[c3]+[e];
[a]+[c]+[e];
[a]+[c]+[e1];
[a]+[c]+[e2];

Thus, the indexing spider may index all possible mini-pages for each embedded third party application 35, ensuring that all other embedded third party applications 35 instances display their home mini-page.

It will be appreciated that search engine friendly renderer 46 may unite pages using the HTML section tag instead of the non-indexed iframe tag thus overcoming the issues concerning non-indexed iframe tag content as discussed herein above. It will be further appreciated that as part of the unification of pages, links from the third party application 35 may be formatted to fit the relevant deep link URL structure in the main site. For example, a link from a blog home page to a post page (in the pertinent blog) may be changed so that it links to the post in the context of the website building system 15 site. Title description, tags and keywords may all be taken from third party application 35 and merged into the meta-tags of the returned pages. Thus, the indexing spider may follow links included in third party application 35 so as to locate additional pages (both inside and outside of third party application 35) which are not included in the sitemap of third party application 35 in order to index them as well.

It will also be appreciated that displayer 52 may be instructed by renderer coordinator 57 to "run" the returned page with executable code (e.g. server-side Javascript or other server-side components) being activated. In the case of user 5 performing a client side operation which activates a server-side component which accesses a database to retrieve records for display, displayer 52 may display the final page to user 5. It will be further appreciated that typically for a spider request, displayer 52 may not be required to display the page but may forward the page to search engine 25 for further processing. In the case of a smart spider which may try to exercise multiple elements of a page (for example cause the page access multiple database records and display them), displayer 52 may display the pertinent page and perform the relevant actions.

Figure 11A:
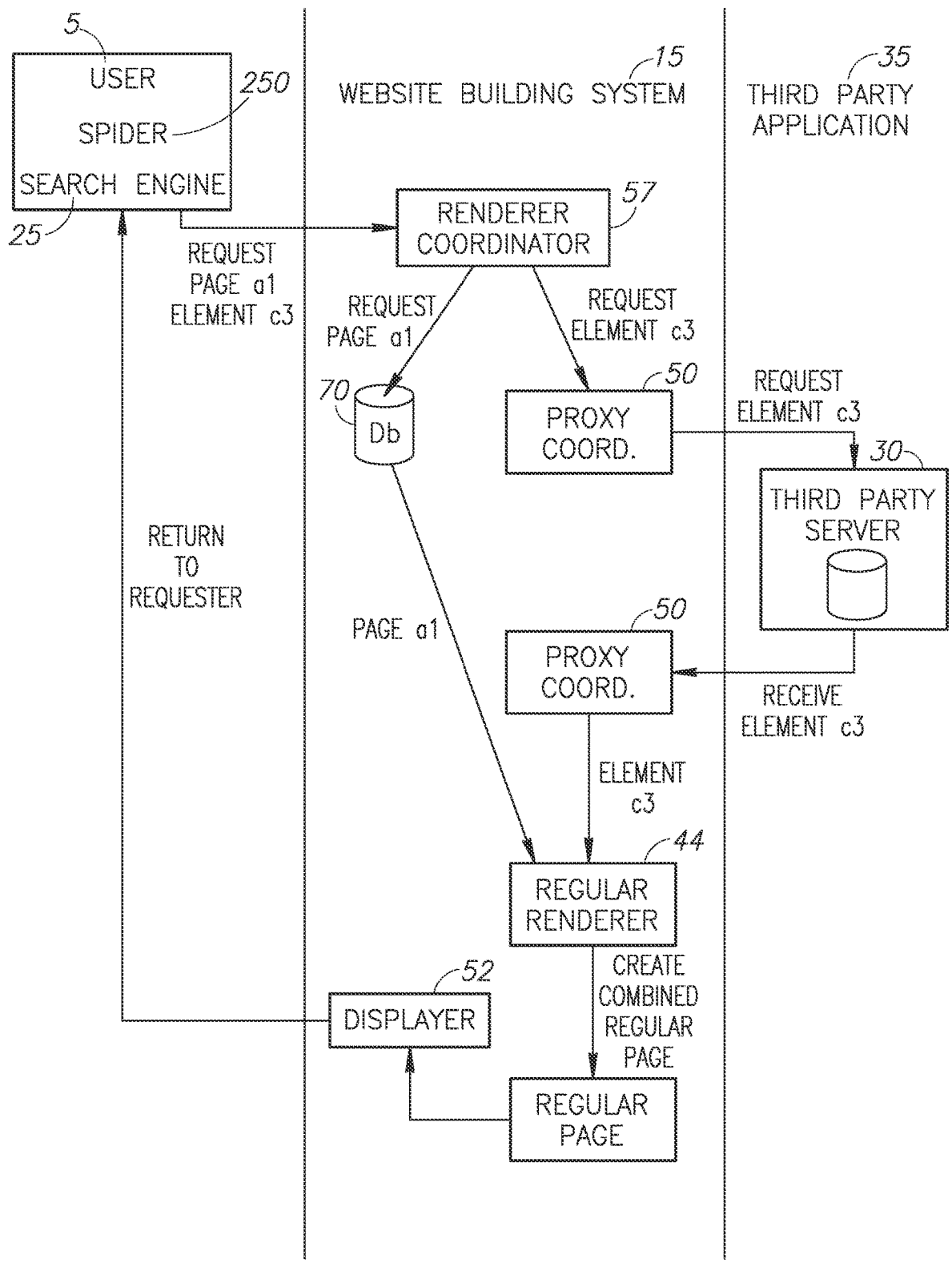
FIGS. 11A, 11B and 11C are schematic illustrations of the different process flows for the system of FIG. 5.
Figure 11B:
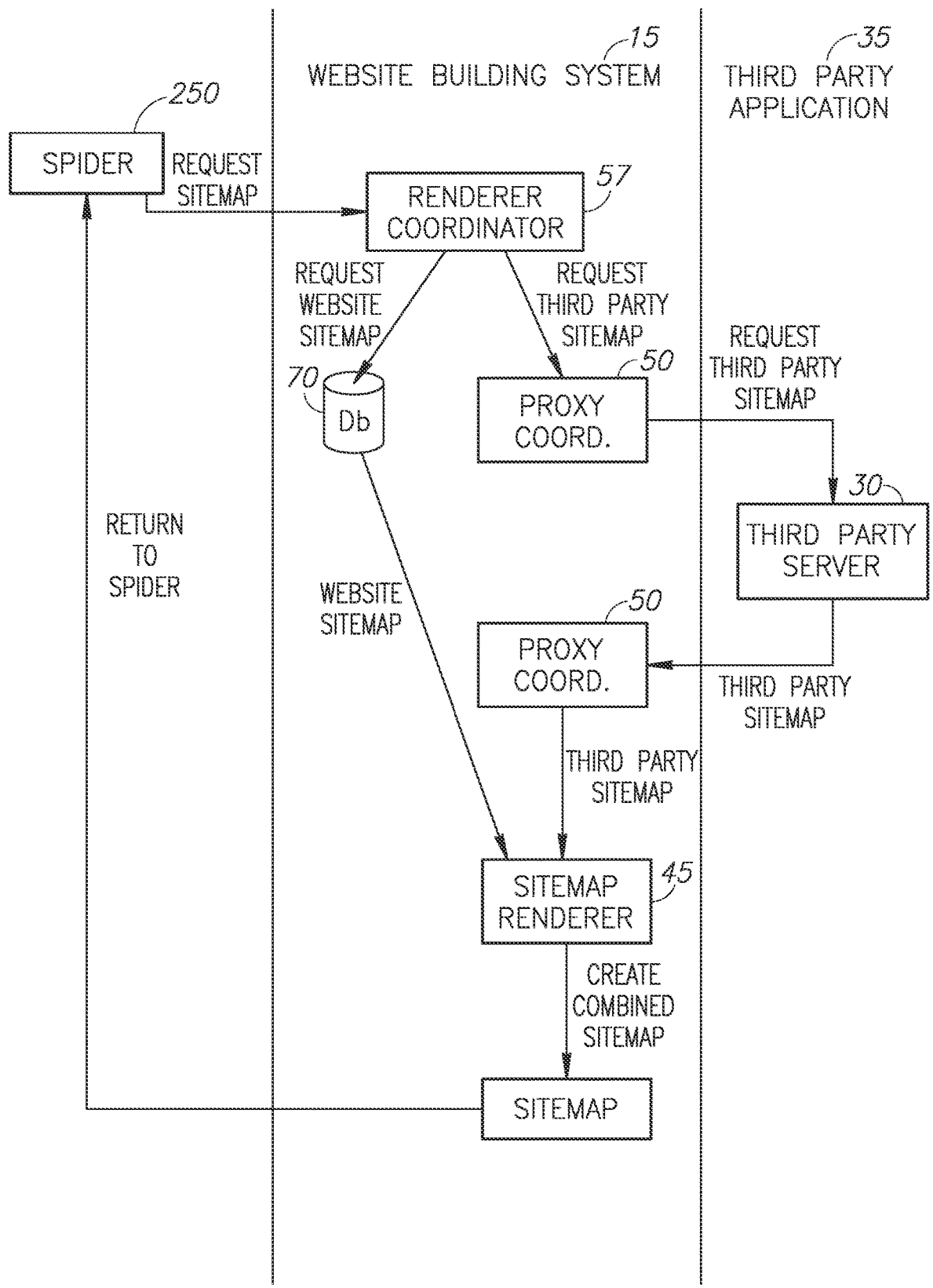
Figure 11C:
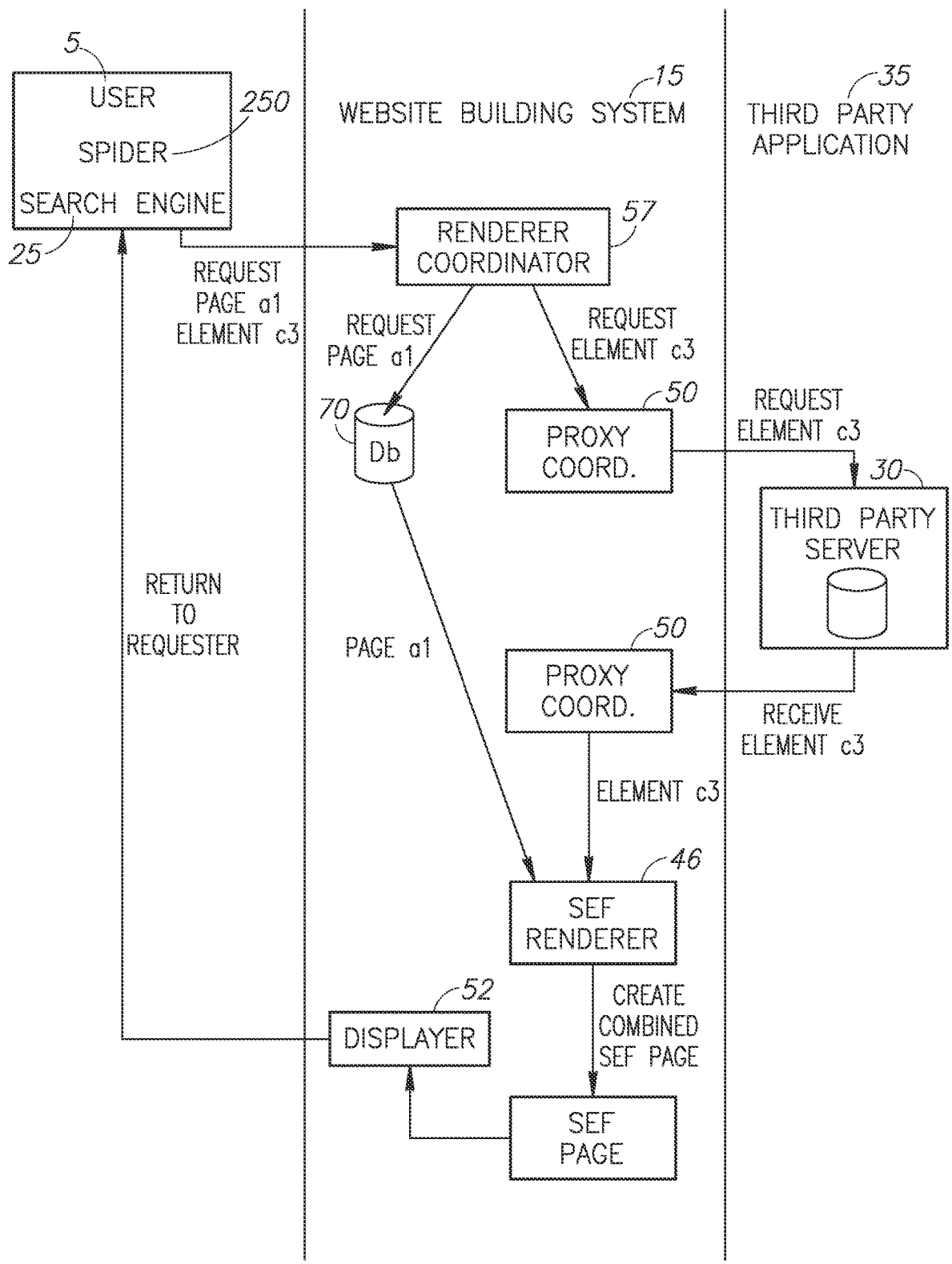

Reference is now made to FIGS. 11A, 11B and 11C which illustrate the different processes which may require the use of renderers 44, 45, 46. FIG. 11A illustrates the process that is carried out when a regular page request is made by user 5, search engine 25 or a spider 250. As is a shown, a request may be made for page a1 from website building system 15 together with element c3 from third party application 35. Renderer coordinator 57 may process the request and request a copy of page a1 from database 70 (via database coordinator 60). Simultaneously, renderer coordinator 57 may instruct proxy coordinator 50 (via TPA content coordinator 51) to retrieve element c3 from third party server 30. Regular renderer 44 may receive both page a1 and element c3 and create a regular page which is returned to user 5/search engine 25/spider 250 via displayer 52.

Reference is now made to FIG. 11B which illustrates the process that is carried out when a sitemap request is made by spider 250. Renderer coordinator 57 may process the request and request a copy of the sitemap of the pertinent website from database 70 (via database coordinator 60). Simultaneously, renderer coordinator 57 may instruct proxy coordinator 50 to retrieve the sitemap of third party application 35 which may be stored on third party server 30. Sitemap renderer 45 may combine the two sitemaps (or multiple site maps if more than one third party application 35 is in use) to create a composite sitemap which may be returned to spider 250.

Reference is now made to FIG. 11C which illustrates the process that is carried out when a search engine friendly page request is made by search engine 25 or spider 250. As is a shown (similar to the process in FIG. 11A), a request may be made for page a1 from website building system 15 together with element c3 from third party application 35. SEF renderer 46 may receive both page a1 and element c3 and create a search engine friendly page which may be returned to spider 250 via displayer 52. As discussed hereinabove, the generated search engine friendly page may differ from the generated regular page in that renderer 46 may remove or substitute any iframe tags which may not be search engine friendly.

Search engine 25 may collect and store the associated URLs of the returned pages and search engine retrieval may return the stored permalinks generated by system 100. Based on the permalinks, system 100 may return to user 5 the generated page including embedded third party application 35 widgets and mini-pages via renderer coordinator 57 and displayer 52 as described herein above. Search engine 25 may also provide information on the query and search terms used to locate the desired page (e.g. passed through the HTTP_REFERER http header). In this scenario, proxy coordinator 50 may pass this information to third party application 35 so that it may (for example) highlight the search terms to improve search engine optimization. Other parameters may also be passed via proxy coordinator 50 such as a login or free/premium status.

It will be appreciated that TPA content coordinator 51 may coordinate the retrieval of content from third party application 35 mini-pages and components. Intelligent third party application processor 58 may be used to add additional functionality (both search engine optimization related and not) by modifying the information passed in both directions.

It will be appreciated that website building system 15 may also act as a proxy server for the input from/output to the spider or user 5 (unless a direct connection has been established) and therefore may implement additional functionality by modifying or analyzing the information passed in both directions. The use of website building system 15 as a proxy server may be automatic or may be controlled by user 5 or by the third party application 35 provider.

If third party application 35 does not provide a required mini-page for display within a given time frame (completely or partially), performance monitor 53 may decide whether web page composer 20 may display the page regardless, possibly using dynamic layout techniques to adjust its layout. Alternatively, if third party application 35 does not provide the required third party application search engine friendly mini-page within a given time frame, performance monitor 53 may elect not to present this page and therefore it may not be included during indexing. Performance monitor 53 may issue alerts, internally to web page composer 40, to the website building system vendor staff, to the third party application 35 staff or to user 5. Performance monitor 53 may also create a performance or error log which may be saved in database 70 via database coordinator 60. These alerts may be particularly useful during the stage of third party application search engine friendly mini-page retrieval for spider indexing since during this process no human user is involved and errors may go unnoticed. Performance monitor 53 may also disable third party application 35 in the context of a specific website building system site or suspend and/or remove it from the AppStore if sufficient timing or error returns are detected.

Typically, automatic search engine optimizers do not work together with third party applications 35 and third party application 35 may provide a dedicated server or endpoint for search engine optimization. Search engine optimization enhancer 54 may apply additional search engine techniques to the third party application 35 mini-pages before they are included in the finalized search engine friendly page in order to improve search engine ranking. For example, if third party application 35 is normally loaded from the URL:

<http:/www.thirdpartysite.com/thirdpartyurl/appid=id& . . . >,

The search engine optimized version may be loaded from a different URL such as:

<http:/www.thirdpartysite.com/seo/thirdpartyurl/appid=id& . . . >

It will be appreciated that as part of the merging of the third party application 35 mini-page into the website building system 15 main page, search engine optimization enhancer 54 may extract the body tag of the third party application 35 page, including it as the content of the third party application 35 component. In addition, enhancer 54 may extract different meta-tags from the third party application 35 mini-pages and may merge them with the meta-tags on the website building system 15 page. It will further be appreciated that enhancer 54 may apply additional optimization techniques to the third party application 35 search engine friendly mini-pages (before including them in the containing site page for the purpose of indexing) so as to improve search engine 25 ranking.

If a given search engine optimization technique is known to be harmful to the search engine ranking, but is still performed by third party application 35, search engine optimization blocker 55 may identify and then remove the use of this technique, thereby enforcing a type of quality control on the search engine friendly mini-pages provided by third party application 35. This may prevent a badly written, un-optimized or possibly outdated search engine optimization technique from harming the ranking of the rest of the site. It will be appreciated that in this manner search engine optimization blocker 55 may also act as a filter or a censor for external search engine optimization techniques. Search engine optimization blocker 55 may further generate alerts, create an alert log or disable third party application 35 (locally or globally) as noted above for performance monitor 53.

BI gatherer 56, may perform business intelligence gathering on behalf of third party application 35 providers, collecting information about user requests and displayed pages, and logging them to database 70 via database coordinator 60. This is important, for example, in a scenario in which the website building system 15 has access to detailed user information which can then be gathered and summarized to third party application 35 without having to provide the actual detailed user information to third party application 35.

It will be appreciated that the application of any of the modules of intelligent third party application processor 58 may be automatic or may be controlled by user 5 or by the third party application 35 provider.

Proxy coordinator 50 may instruct database coordinator 60 to store all configuration and collected data on database 70 and may instruct database coordinator 60 to retrieve data as required.

Thus system 100 may provide for each page, an alternate version of the displayed page which may be formatted and optimized for reading by search engine spiders (i.e. search engine friendly). System 100 may also provide a search engine friendly version of the mini-pages from a third party application using a modified URL or possibly a specific parameter in conjunction with the URL. System 100 may also implement search engine optimization techniques in the creation of page variants to improve the ranking of the specific pages by crawling search engines. System 100 may also display the search engine friendly page version (instead of the regular version) when crawler access is detected through any means such as the originating IP, request structure, request headers etc. System 100 may then generate a site map file in order to guide the spiders in question to which URLs to request so that all relevant site pages may be indexed.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a website, the method comprising:
    detecting the presence of a spider associated with a search engine;
    receiving an incoming request from said spider via a uniform resource locator (URL);
    extracting identifiers for at least one third party application (TPA) embedded as at least one instance in said website, said at least one TPA having mini pages and components;
    reconstructing said URL as a permalink with said extracted identifiers, wherein said permalink includes deep links pointing to at least said mini pages in said at least one TPA;
    forwarding said URL to said at least one TPA and requesting content according to said incoming request;
    parsing the output of said least one TPA to determine at least non-text components according to a request from said search engine spider, said non-text components having contained text;
    creating a search engine friendly page containing at least said components and mini-pages provided by said TPA with said extracted contained text; and
    rendering said search engine friendly page to said spider.

2. The method according to claim 1 wherein said at least one TPA is at least one of: a single page and a multipage application.

3. The method according to claim 1 wherein said non-text components contain video.

4. The method according to claim 1 wherein said detecting is via at least one of: said spider originating IP, the request structure of said spider, the request header of said spider and the use of AJAX crawling URLs (uniform resource locators).

5. The method according to claim 1 wherein said creating a search engine friendly page comprises substituting HTML iframe tags with tags visible to said spider.

6. The method according to claim 1 wherein said request is at least one of: a manually entered URL of a specific page, the homepage of a requested site or a request to a general page redirected by said search engine.

7. The method according to claim 1 wherein said contained text is at least one of: encoded and interleaved.

8. A system for a website, the system comprising:
    one or more processors configured to perform operations comprising: detecting the presence of and receiving an incoming request from a spider associated with a search engine via a uniform request locator (URL);
    extracting identifiers for at least one third party application (TPA) embedded as at least one instance in said website, said at least one TPA having mini pages and components;
    constructing said URL as a permalink with said extracted identifiers, wherein said permalink includes deep links pointing to at least said mini pages in said at least one TPA and forwarding said URL to said at least one TPA and requesting content according to said incoming request;
    parsing the output of said least one TPA to determine non-text components according to a request from said search engine spider, said non-text components having contained text and to extract said text;
    creating a search engine friendly page containing at least said components and mini pages provided by said TPA with said extracted contained text in formatted and optimized format; and
    rendering said search engine friendly page to said spider.

9. The system according to claim 8 wherein said at least one TPA is at least one of: a single page and a multipage application.

10. The system according to claim 9 wherein said non-text components contain video.

11. The system according to claim 9 wherein said access type detector detects via at least one of: said spider originating IP, the request structure of said spider, the request header of said spider and the use of AJAX crawling URLs (uniform resource locators).

12. The system according to claim 9 wherein said renderer substitutes HTML iframe tags with tags visible to said spider.

13. The system according to claim 8 wherein said request is at least one of: a manually entered URL of a specific page, the homepage of a requested site or a request to a general page redirected by said search engine.

14. The system according to claim 8 wherein said contained text is at least one of: encoded and interleaved.

* * * * *